United States Patent Office 2,894,029
Patented July 7, 1959

2,894,029

S-SUBSTITUTED-N-BENZHYDRYL PSEUDOTHIO-
UREAS AND THEIR PSEUDOTHIOURONIUM
SALTS

Stanley O. Winthrop, Montreal, Quebec, Canada, assignor to American Home Products Corporation, New York, N.Y., a corporation of Delaware No Drawing. Application March 11, 1958
Serial No. 720,531

6 Claims. (Cl. 260—564)

This invention relates to basic, S-substituted derivatives of N-benzhydrylthiourea and to salts of these compounds. More particularly, the substituent attached to sulfur in the novel pseudothioureas of my invention is ω-alkoxyalkyl or ω-hydroxyalkyl, and the new pseudothiouronium salts of these bases are the acid addition salts.

The new compounds, in base form, may be represented by the generic structural formula

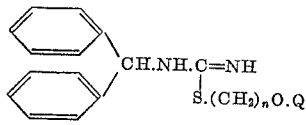

where $n$ is an integer, either 2 or 3; and Q represents hydrogen or lower alkyl.

Where the compounds, in base form, contain an ω-hydroxyalkyl substituent attached to sulfur, they may be represented by the structural formula

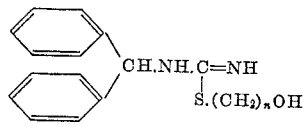

where $n$ has the above significance, i.e. it is an integer selected from the group which consists of 2 and 3.

It should be understood, of course, that the structural formulae given represent the new basic compounds in one of the tautomeric forms possible, and that the compounds, in a different tautomeric form, may be structurally represented by a somewhat different formula.

As stated, my invention also relates to salts of these S-substituted pseudothiourea bases, more particularly to the acid addition salts thereof, and especially to the acid addition salts formed with hydrohalic acids such as hydrochloric acid, hydrobromic acid and hydroiodic acid.

The new chemical compounds, both in base and salt forms, possess valuable pharmacological properties, being particularly suitable as stimulants for the central nervous system. In the amounts administered for this purpose they are non-toxic. Many of the new compounds also possess antispasmodic activity of musculotropic character.

When preparing S-(ω-hydroxyalkyl) substituted pseudothiouronium salts, in accordance with my invention, N-benzhydrylthiourea is reacted with an ω-haloalkanol by bringing the reagents together in a suitable solvent. Ordinarily an excess of the ω-haloalkanol is used, and the reaction mixture is heated to reflux. The desired pseudothiouronium salt is recovered from the reaction mixture.

When preparing S-(ω-alkoxyalkyl) substituted pseudothiouronium salts, N-benzhydrylthiourea is reacted with an ω-alkoxyalkyl halide by bringing the reagents together in a suitable solvent and heating to reflux. The pseudothiouronium salt is then recovered.

In each case the free base, i.e. N-benzhydryl-S-(ω-hydroxyalkyl)pseudothiourea, or N-benzhydryl-S-(ω-alkoxyalkyl)pseudothiourea, is prepared by treating a solution of the corresponding salt in aqueous methanol with sodium carbonate. The free base is precipitated in the reaction medium.

Details of these procedures are given in the following illustrative examples.

EXAMPLE 1

N-benzhydryl-S-(2-hydroxyethyl)pseudothiouronium bromide 2.4 grams (0.01 mole) of N-benzhydryl thiourea and 1.9 gram (0.015 mole) of ethylenebromohydrin were dissolved in 75 milliliters of ethanol and the solution refluxed for 16 hours. The ethanol was then removed by evaporation in vacuo, i.e. at a reduced pressure less than atmospheric, and the oily residue resulting was crystallized from a mixture of isopropanol and ether. Upon recrystallization of the solid product from acetonitrile there was obtained N-benzhydryl-S-(2-hydroxyethyl)pseudothiouronium bromide, a representative sample of which melted at 179–182° C. Analysis confirmed the empiric formula $C_{16}H_{19}N_2SOBr$.

EXAMPLE 2

N-benzhydryl-S-(3-hydroxypropyl)pseudothiouronium bromide 4.8 grams (0.02 mole) of N-benzhydrylthiourea and 4.2 grams (0.03 mole) of 3-bromopropanol were dissolved in 100 milliliters of ethanol and the solution refluxed for 16 hours. Upon cooling and evaporation to dryness there was recovered an oily residue, which solidified on standing. By recrystallizaion of the solid product twice from acetonitrile, the purified N-benzhydryl-S-(3-hydroxypropyl)pseudothiouronium bromide, melting at 129–131° C., was secured. Analysis confirmed the empiric formula $C_{17}H_{21}N_2SOBr$.

EXAMPLE 3

N-benzhydryl-S-(2-ethoxyethyl)pseudothiouronium iodide 2.42 grams (0.01 mole) of N-benzhydryl thiourea and 3.0 grams (0.015 mole) of 2-ethoxyethyliodide were dissolved in 75 milliliters of ethanol and the solution refluxed for 2 days. On cooling and evaporation to dryness, there was secured an oily residue which solidified on standing. Two recrystallizations of the solid product from a mixture of isopropanol and ether gave the purified product, N-benzhydryl-S-(2-ethoxyethyl)pseudothiouronium iodide, a representative sample of which melted at 121–123° C. Analysis confirmed the empiric formula $C_{18}H_{23}N_2SOI$.

EXAMPLE 4

N-benzhydryl-S-(3-hydroxypropyl)pseudothiourea 1.0 gram of N-benzhydryl-S-(3-hydroxypropyl)pseudothiouronium bromide, as prepared in Example 2, was dissolved in aqueous methanol, and a solution of sodium carbonate added thereto. There was thus secured 0.5 gram of the free base, N-benzhydryl-S-(3-hydroxyproyl)-pseudothiourea, melting at 107–108° C. Analysis confirmed the empiric formula $C_{17}H_{20}N_2SO$.

I claim:

1. A compound selected from the group which consists of bases of the formula

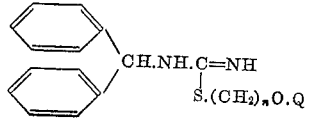

where Q is selected from the group which consists of hydrogen and lower alkyl, and $n$ is an integer from 2 to 3; and hydrohalide salts of said bases.

2. A compound of the formula

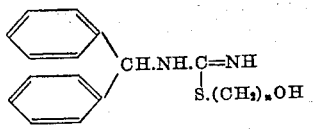

where $n$ is an integer from 2 to 3.

3. N-benzhydryl-S-(3-hydroxypropyl)pseudothiourea.
4. N-benzhydryl - S - (2-hydroxyethyl)pseudothiouronium bromide.
5. N-benzhydryl - S - (3-hydroxyproyl)pseudothiouronium bromide.
6. N-benzhydryl - S - (2-ethoxyethyl)pseudothiouronium iodide.

References Cited in the file of this patent

Borovicka et al.: Chemical Abstracts, vol. 45, p. 577 (1951).
Exner et al.: Chemical Abstracts, volume 49, p. 1664 (1955).
Wheeler: American Chemical Journal, vol. 26 (1901), p. 353.
Kaye et al.: J.A.C.S., vol. 74 (1952), pp. 403 to 407.